(12) United States Patent
Kitamura et al.

(10) Patent No.: US 6,185,793 B1
(45) Date of Patent: Feb. 13, 2001

(54) BOOT BAND

(75) Inventors: Yoshiharu Kitamura; Yoshihiro Hemmi; Takashi Ogino, all of Komagane (JP)

(73) Assignee: NHK Spring Co., Ltd., Yokohama (JP)

( * ) Notice: Under 35 U.S.C. 154(b), the term of this patent shall be extended for 0 days.

(21) Appl. No.: 09/342,994

(22) Filed: Jun. 29, 1999

(30) Foreign Application Priority Data

Jul. 3, 1998 (JP) .................................................. 10-189136

(51) Int. Cl.[7] ............................. B65D 63/02; F16L 33/00
(52) U.S. Cl. .................. 24/20 R; 24/20 EE; 24/20 CW; 24/23 EE
(58) Field of Search ............................ 24/20 R, 20 CW, 24/20 W, 20 TT, 20 EE, 23 EE

(56) References Cited

U.S. PATENT DOCUMENTS

| | | | |
|---|---|---|---|
| 4,517,708 | * 5/1985 | Calmettes et al. | ................ 24/20 CW |
| 4,674,720 | * 6/1987 | Fetsch | ................................. 24/20 EE |
| 4,713,863 | * 12/1987 | Jennings | ................................ 24/20 R |
| 4,742,600 | * 5/1988 | Calmettes et al. | ................... 24/20 R |
| 4,987,652 | * 1/1991 | Spaulding | ............................. 24/20 R |
| 5,430,912 | * 7/1995 | Renzo et al. | ........................... 24/20 R |

* cited by examiner

*Primary Examiner*—Victor N. Sakran
(74) *Attorney, Agent, or Firm*—Frishauf, Holtz, Goodman, Langer & Chick, P.C.

(57) ABSTRACT

The boot band is made of a belt-like metal band body having first and second ends, and includes first and second caulking portions which are plastically deformed during assembly. An engage nail is provided at the top end of a leg portion of the first caulking portion. The second caulking portion includes of first and second projection walls, and a receive hole in which the engage nail is inserted is formed in the second projection wall. When the winding diameter of the band body is decreased to some extent, the second caulking portion is inserted inside the first caulking portion, and the engage nail and the receive hole are engaged with each other. In this state, the first and second caulking portions are integrally deformed plastically by a tool.

5 Claims, 8 Drawing Sheets

BOOT BAND

BACKGROUND OF THE INVENTION

The present invention relates to a boot band used for fixing a boot made of synthetic resins, rubber, or the like, to a target member to be tightened.

A boot is used as a component for a vehicle or the like. The boot is made of synthetic resins, rubber, or the like. In the present specification, the category of a boot includes cylindrical members like a hose, a tube, and the like. Conventionally, a boot band formed of a metal belt-like member has been used to fix such a boot to a target member to be tightened.

This kind of boot band, as described in U.S. Pat. No. 4,622,720 for example, comprises a nail provided at an inner overlapping portion of a belt-like band body, a receive hole which is formed at an outer overlapping portion of the band body and can be engaged with the nail, and an ear portion to be plastically deformed (or caulked) when tightening the band body. In this boot band, the band body is wound on a target member to be tightened, and the nail is hooked in the receive hole. Thereafter, the ear portion is caulked by a tool to shorten the circumference length of the band body, so the band body is fixed to the target member to be tightened.

In case of the conventional boot band described above, since a tightening force is applied to the band body by caulking the ear portion, the ear portion after caulking behaves to recover its original shape. A problem hence occurs in that the tightening force is difficult to maintain if the rigidity of the ear portion is low. When this kind of boot band is set on a target member to be tightened, handling is easier as the winding diameter of the band is large to some extent. It is desired that the winding diameter greatly differ between before and after caulking. As a countermeasure, it may be considered that the tightening stroke of the band body is enlarged by enlarging the ear portion. However, if the ear portion is thus enlarged, not only the amount of projection to the outside becomes large, but also the ear portion after caulking easily returns in the direction in which the band is loosened, so the tightening force is more difficult to maintain.

Also, in a conventional boot band, the nail (or engage portion) and the ear portion (or caulking portion) are provided separately. Therefore, the service of temporal fixing by hooking the nail in the receive hole and the service of caulking the ear portion cannot be sequentially be carried out with use of one same tool, so the tool must be replaced and attached. Thus, there is room for improvement in assembly workability.

BRIEF SUMMARY OF THE INVENTION

The present invention hence has an object of providing a boot band which realizes excellent assembly service workability and restricts loosening of the tightening force.

To achieve the above object, the present invention provides a boot band made of a belt-like metal band body having first and second open ends, which is set on a target member to be tightened in a state where the band body is rounded like a ring such that the first end positioned outside, comprising: a first caulking portion having a first leg portion which is provided at a position close to the first end of the band body and stands outward from the band body, a bridge portion which extends from the first leg portion toward the first end in a lengthwise direction of the band body, and a second leg portion which is bent from the bridge portion so as to face the first leg portion; an engage nail provided at a top end of the second leg portion of the first caulking portion; a second caulking portion to be inserted inside the first caulking portion when a winding diameter of the band body is decreased, the second caulking portion having a first projection wall which is provided at a position close to the second end of the band body and projects outward from the band body, and a second projection wall which is bent to be adjacent to the first projection wall; and a receive hole which is formed in the first projection wall of the second caulking portion and is engaged with the engage nail in a state where the second caulking portion is inserted inside the first caulking portion.

According to the boot band constructed in this manner, the band body of an open type is wound on a target member to be tightened, and the winding diameter of the band body is decreased, i.e., the circumferential length of the band body is decreased. Then, the second caulking portion enters inside the first caulking portion, and the engage nail is engaged in the receive hole, thereby making a temporal fixing state. This is a temporal fixing service. From this temporal fixing state, the first and second caulking portions are integrally deformed plastically with use of a tool, thereby to further decreased the winding diameter of the band body. In this manner, the band body is fixed to the target member to be tightened, with a tightening force. This caulking service and the temporal fixing service can be sequentially carried out with use of one same tool.

Also, according to the present invention, since the band body is of an open type, the tightening stroke of the band body can be large when setting the band body on a target member to be tightened, so assembly services are easy. In addition, since the engage nail and receive hole are provided in the first and second caulking portions, the temporal fixing service for engaging the engage nail in the receive hole and the service for caulking the caulking portions can be carried out sequentially with use of one same tool. Therefore, it is not necessary to replace the tool halfway during services, and thus, assembly services can be carried out efficiently. Also, since the second caulking portion is inserted inside the first caulking portion, the outward projection amount from the band can be small.

The band body preferably comprises a convex portion and a temporal fixing stopper portion. In this structure, in a state where the winding diameter of the band body is decreased to some extent, the convex portion and the temporal fixing stopper portion contact each other thereby temporally fixing the band body with an appropriate winding diameter. According to this invention, since the band body is temporally fixed with an appropriate winding diameter, the assembly feasibility is excellent with respect to the target member to be tightened. In this case, the winding diameter of the band body is maintained in a state where the distance from the first caulking portion to the second caulking portion is maintained to be constant. Therefore, an advantage is attained for automating the caulking process equipment.

A guide groove is preferably formed in the band body according to the present invention. In this structure, since the convex portion moves along the guide groove when decreasing the winding diameter of the band body, the engage nail is guided substantially straight toward the second caulking portion and the receive hole. According to this invention, the convex portion can be moved in the lengthwise direction of the band body along the guide groove, so the engage nail can be securely guided to the receive hole.

Also, the band body according to the present invention preferably comprises a tightness retain stopper portion. In this structure, when the first and second caulking portions are plastically deformed to tighten the band body to a predetermined circumferential length, the convex portion and the tightness retain stopper portion contact with each other. As a result of this, the tightening force can be maintained by the stopper portion, convex portion, and caulking portions. In this invention, the tightening force is not received by only one caulking portion (or ear portion) as in a conventional boot band, but is received by both the first and second caulking portions. Therefore, the plate thickness and width of the caulking portions can be smaller than those of the conventional boot band. Also, returning of the first caulking portion is restricted by the second caulking portion which causes a less returning amount, so the returning amount of the caulking portions can be smaller.

The convex portion of this invention preferably comprises a vertical wall. In this case, at the time when the band body is tightened to a predetermined circumferential length, the vertical wall moves in the thickness direction of the band body and is engaged with the tightness retain stopper portion. At this time, since the engage nail and the receive hole are engaged with each other, the outer overlapping portion of the band body is prevented from moving apart from the inner overlapping force. Therefore, the engagement between the convex portion and the vertical wall is prevented from being released. According to this invention, when the vertical wall is engaged with the stopper portion, it is possible to avoid a behavior of the band body that it returns slightly in the direction in which the band body is loosened after the band body is once moved in the tightening direction. Therefore, factors that will loosen the band can be reduced much more.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, an embodiment of the boot band according to the present invention will be explained with reference to FIGS. 1 to 8.

Figure 1:
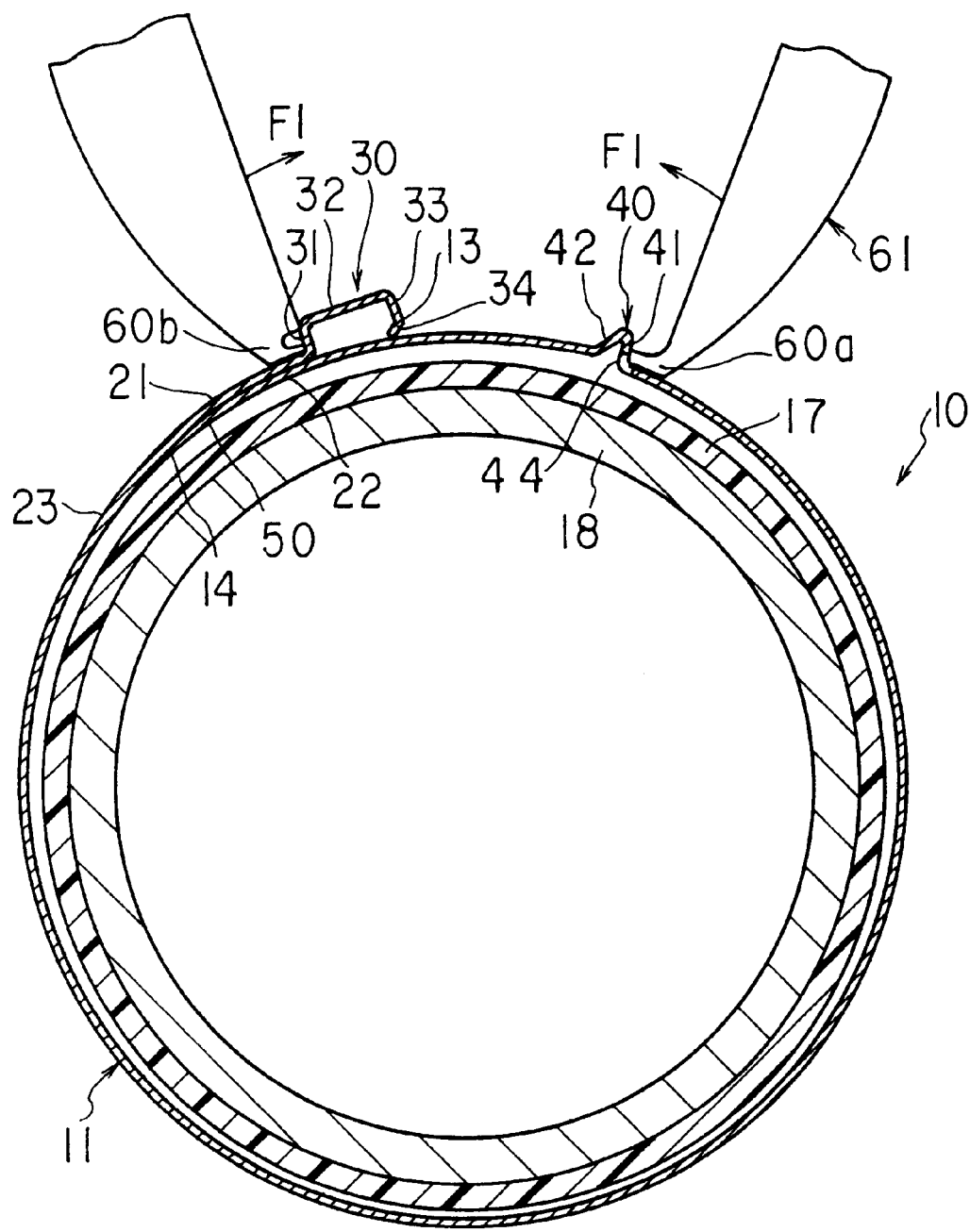
FIG. 1 is a cross-sectional view showing an embodiment of the present invention before caulking the boot band.
Figure 2:
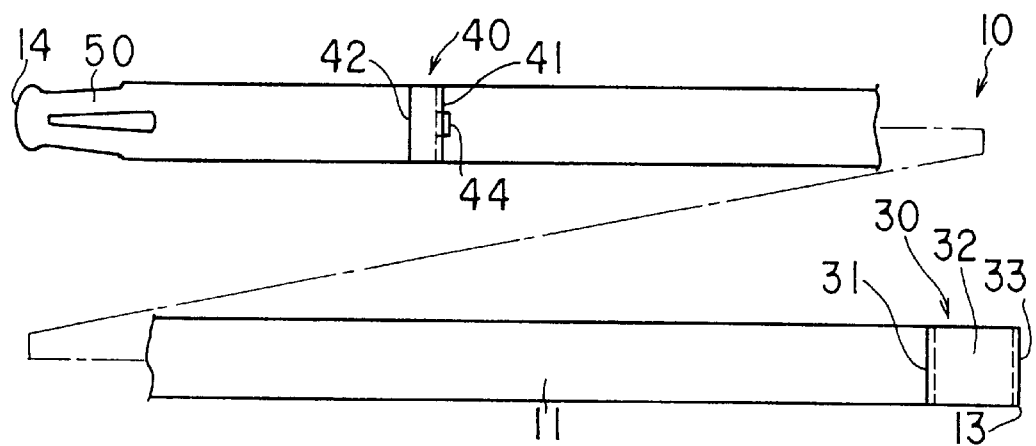
FIG. 2 is an extended plan view showing the boot band in FIG. 1.

A boot band 10 has an open type band body 11 formed of a belt-like member made of metal (e.g., stainless steel) as shown in FIG. 2 and the like. Both ends of the band body 11 form open first and second ends 13 and 14. As shown in FIG. 1 and the like, the band body 11 is wound like a ring on a target member 17 to be tightened such that the first end 13 positioned outside. For example, the target object 17 to be tightened is a boot made of synthetic resins provided on a cylindrical member 18 in a power transmission system of a vehicle.

The band body 11 rounded like a ring comprises an outer overlapping portion 21 positioned near the first end 13, an inner overlapping portion 22 positioned near the second end 14, and an intermediate portion 23 (not overlapped) positioned between the overlapping portions 21 and 22 in the lengthwise direction. The band body 11 is shaped as ring to some extent.

Figure 3:
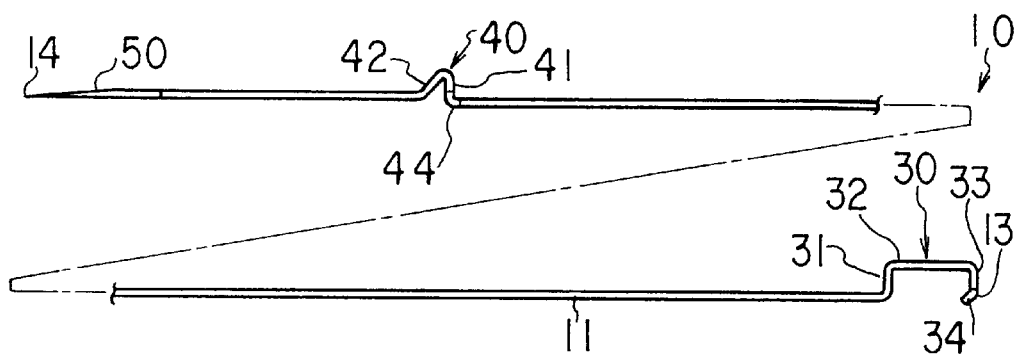
FIG. 3 is an extended side view showing the boot band in FIG. 1.

A first caulking portion 30 projecting like an ear is provided at a position on the band body 11 close to the first end 13. As shown in FIG. 3, the first caulking portion 30 has a first leg portion 31 standing outward from the band body 11, a bridge portion 32 extending in the lengthwise direction of the band body 11 from the first leg portion 31 toward the first end 13, and a second leg portion 33 bent from the bridge portion 32 so as to face the first leg portion 31. The portion 30 is thus formed in an inverted U-shape, viewed from the side.

Figure 4:
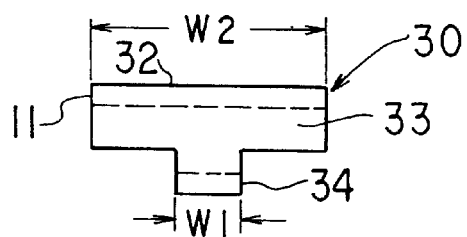
FIG. 4 is a front view showing a first caulking portion of the boot band in FIG. 1.

As shown in FIG. 1 and the like, an engage nail 34 facing in the direction toward the inner overlapping portion 22 is provided at the top end of the second leg portion 33. This engage nail 34 has a shape bent like a hook so as to face the first leg portion 31. As shown in FIG. 4, the width W1 of the engage nail 34 is narrower than the width W2 of the band body 11.

Figure 5:
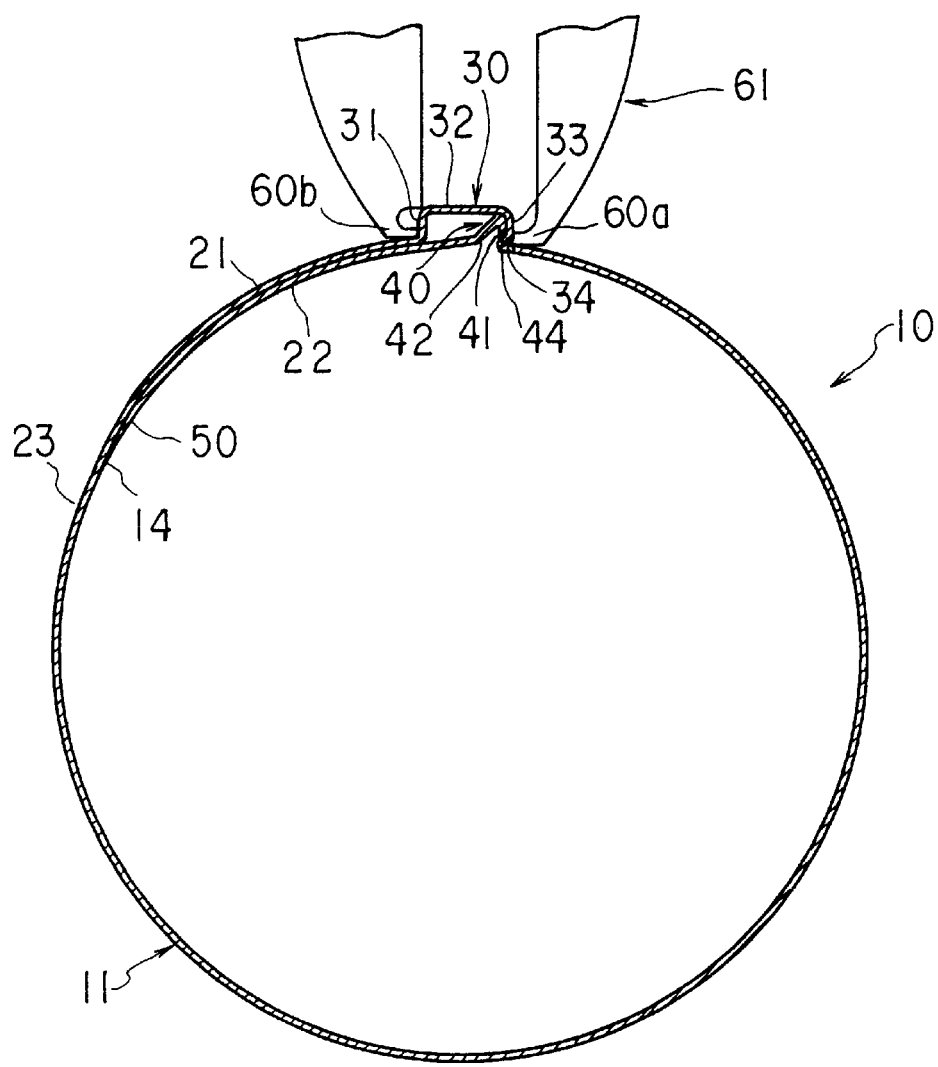
FIG. 5 is a cross-sectional view where an engage nail of the boot band in FIG. 1 is engaged in a receive hole.

A second caulking portion 40 is provided at a portion of the band body 11 close to the second end 14. The second caulking portion 40 has a smaller size than the first caulking portion 30, and includes a first projection wall 41 standing outward from the band body 11, and a second projection wall 42 bent so as to be adjacent to the first projection wall 41, in the side close to the second end 14 from the first projection wall 41. The second caulking portion 40 has an inverted V-shape in the side view. The second caulking portion 40 is arranged such that this portion 40 is inserted between the leg portions 31 and 33 of the first caulking portion 30 when the band body 11 is tightened to a certain winding diameter, as shown in FIG. 5.

Figure 6:
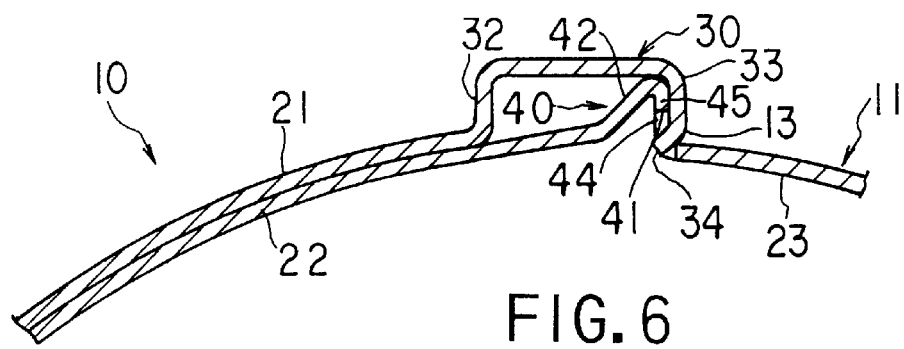
FIG. 6 is an enlarged cross-sectional view showing a part of the boot band in FIG. 5.

A receive hole 44 is formed at the base portion of the first projection wall 41 of the second caulking portion 40. As shown in FIGS. 5 and 6, when the band body 11 is tightened to a certain winding diameter, the second caulking portion 40 enters into the inside of the first caulking portion 30 and the engage nail 34 is inserted into the receive hole 44. Thus, the engage nail 34 is engaged on a circumferential edge 45 of the receive hole 44.

An area of several mm or cm from the second end 14 forms a tapered portion 50 where the plate thickness is reduced toward the second end 14. By providing this tapered portion 50, any gap which will cause problems in practical use can be prevented from being created between the inner circumferential surface of the intermediate portion 23 in the lengthwise direction of the band body 11 and the second end 14. In this case, the sealing achieved by the boot band 11 against the target member 17 to be tightened can be improved much more.

Note that the target member 17 to be tightened, shown in FIG. 1, will be omitted from FIGS. 5, 7, 9, 11, and 13 which will be described later. Needless to say, however, it should be naturally understood that the target member 17 actually exists inside the boot band 10 also in those FIGS. 5, 7, 9, 11 and 13.

Next explanation will be made of an assembly procedure for the boot band 10, and the like.

A boot band 10 as shown in FIG. 1, which has been previously rounded like a ring to some extent, is set outside a target member 17 to be tightened. Further, by a pair of arms 60a and 60b of a tool 61 or open/close arms of an automatic caulking machine, the tool 61 is operated to be tightened in the direction (or the direction indicated by an arrow F1) in which the winding diameter of the band body 11 decreases. The outer overlapping portion 21 and the inner overlapping portion 22 are moved relatively in the direction of the arrow F1 thereby shortening the winding diameter (or circumferential length) of the band body 11.

The engage nail 34 climbs over the inclined second projection wall 42 of the second caulking portion 40, thereby to insert the second caulking portion 40 between the leg portions 31 and 33 of the first caulking portion 30, as shown in FIGS. 5 and 6, and thereby engaging the engage nail 34 into the receive hole 44. The top end of the arm 60a of the tool 60 is recessed at the position corresponding to the receive hole 44 so that the arm 60a might not interfere when the engage nail 34 enters into the receive hole 44.

In the state where the engage nail 34 is inserted in the receive hole 44, this boot band 10 behaves to widen the winding diameter due to the elastic spring-back force of band body. However, since the engage nail 34 and the circumferential edge 45 of the receive hole 44 are engaged with each other, the band body 11 cannot be widened any more. That is, the winding diameter is maintained such that the inner diameter of the band body 11 is slightly greater than the outer diameter of the target member 17 to be tightened.

Figure 7:
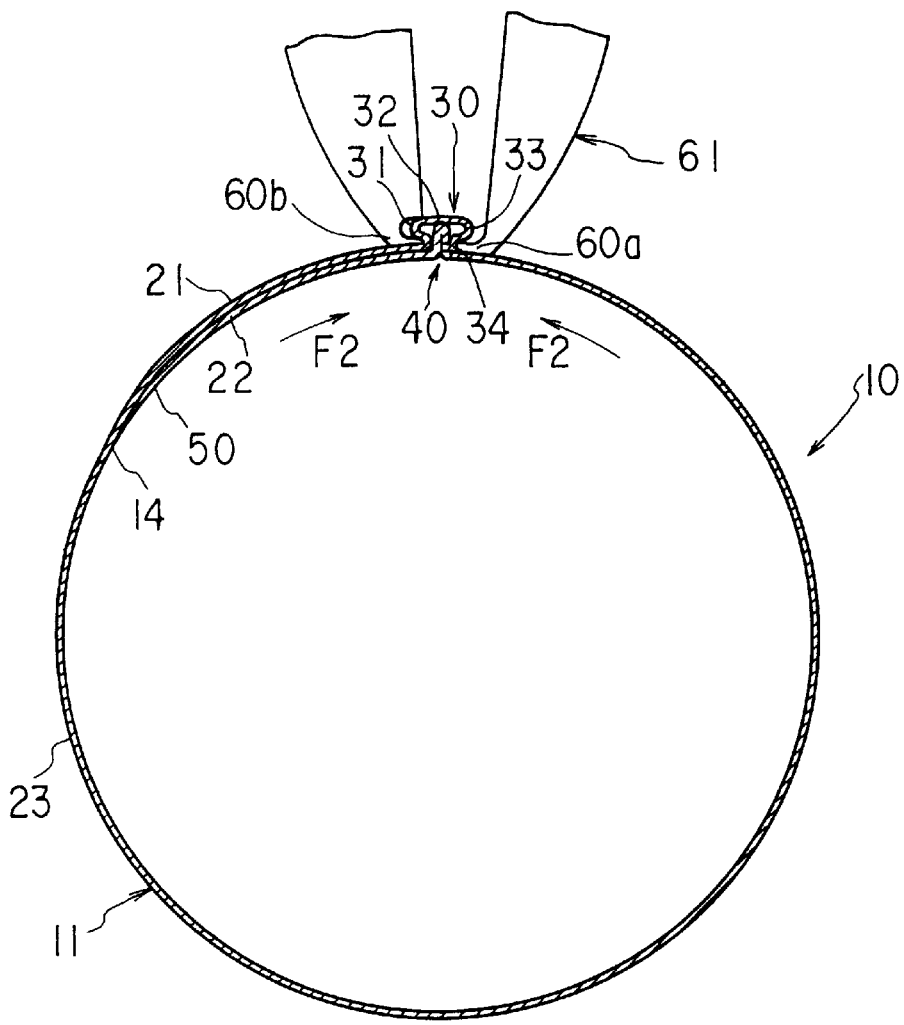
FIG. 7 is a cross-sectional view where fist and second caulking portions of the boot band in FIG. 1 are caulked.
Figure 8:
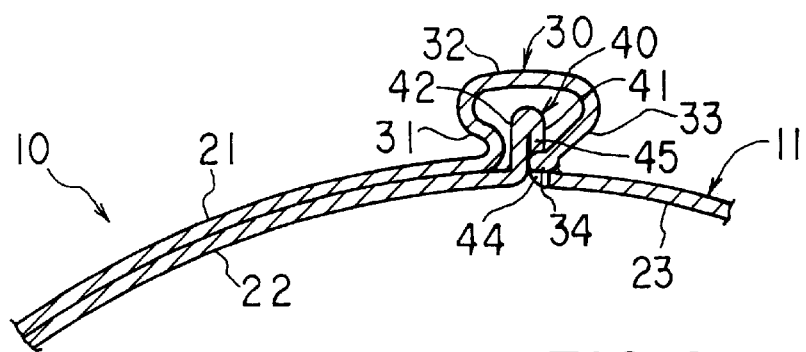
FIG. 8 is an enlarged cross-sectional view showing a part of the boot band in FIG. 7.

The leg portions 31 and 33 of the first caulking portion 30 are plastically deformed (or caulked) as shown in FIGS. 7 and 8, by the tool 61. In this manner, the outer overlapping portion 21 and the inner overlapping portion 22 are relatively moved further in the direction indicated by the arrow F2 in FIG. 7. Therefore, the winding diameter or the circumferential length of the band body 11 is decreased much more, so the target member 17 (shown in FIG. 1) is tightened by the inner circumferential surface of the band body 11.

Note that the present invention is not limited to the embodiment described above, but can be practiced in forms of various embodiments as will be described later. In any of the following embodiments, the portions common to the first embodiment will be denoted by the same reference symbols as those in the first embodiment, and explanation of those portions will be omitted.

Figure 9:
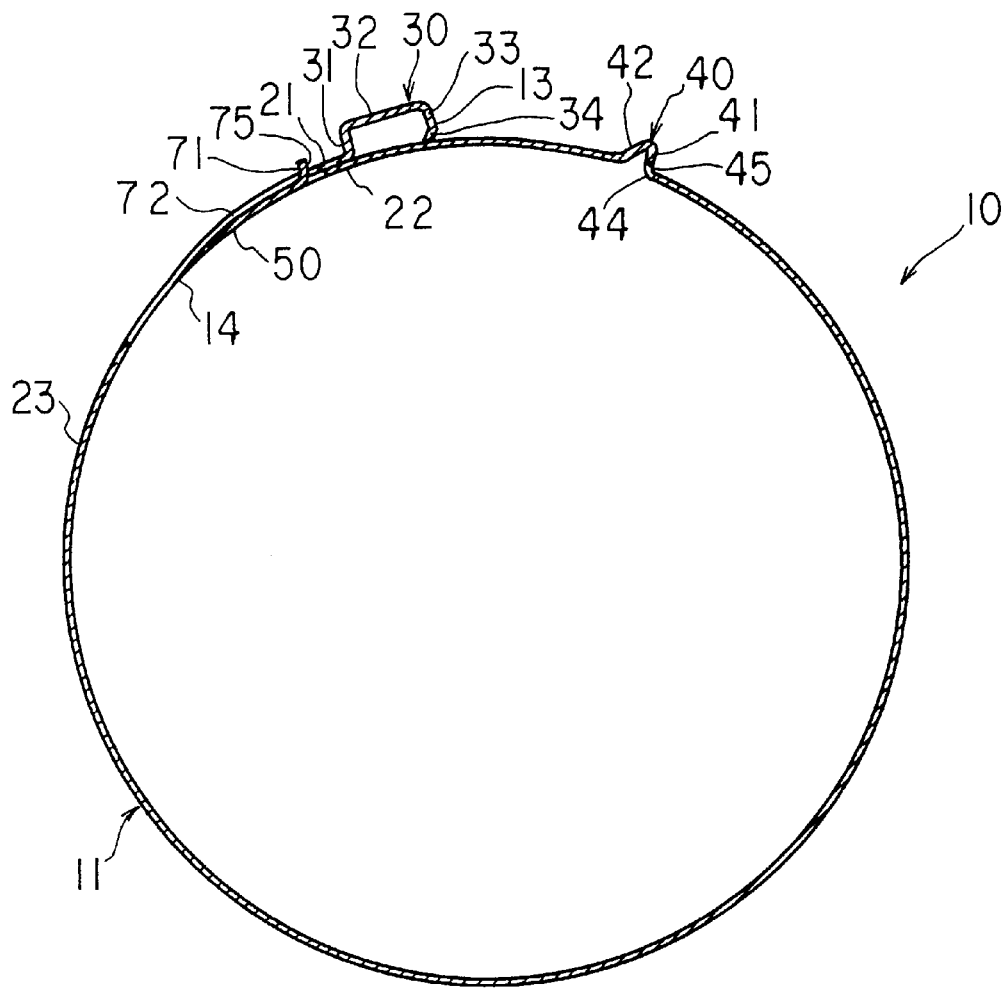
FIG. 9 is a cross-sectional view showing a boot band according to a second embodiment of the present invention.
Figure 10:
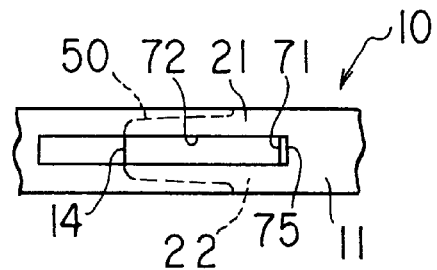
FIG. 10 is a plan view showing a part of the boot band in FIG. 9.

In the second embodiment shown in FIGS. 9 and 10, a convex portion 71 is provided at the inner overlapping portion 22 of the band body 11, and a guide groove 72 extending in the lengthwise direction of the band body 11 is formed in the outer overlapping portion 21. The guide groove 72 extends in the direction toward the second end 14 from the vicinity of the first caulking portion 30. The convex portion 71 is provided between the second end 14 and the second caulking portion 40 and projects outwards from the band body 11. The convex portion 71 is inserted into the guide groove 72. Kept inserted in the guide groove 72, the convex portion 71 is movable in the lengthwise direction of the band body 11.

A temporal fixing stopper portion 75 is provided at one end of the guide groove 72, i.e., at the end thereof close to the first caulking portion 30. This stopper portion 75 makes contact with the convex portion 71 when the winding diameter of the band body 11 is decreased to some extent.

According to the second embodiment constructed in the manner described above, the convex portion 71 and the temporal fixing stopper portion 75 contact with each other in a state that the boot band 10 is set on a target member 17 (shown in FIG. 1) to be tightened and the winding diameter of the band body 11 is decreased to some extent. The band body 11 behaves to widen the winding diameter due to its own elastic spring-back force. The state of this temporal fixing in which the winding diameter of the band body 11 is widened to some extent can be maintained by the spring-back force. From this state, the winding diameter of the band body 11 is further decreased, thereby to insert the second caulking portion 40 inside the first caulking portion 30, like in the first embodiment (in FIG. 5), and to insert the engage nail 34 into the receive hole 44. Thereafter, like in the first embodiment (in FIG. 7), the first caulking portion 30 and the second caulking portion 40 are integrally deformed plastically by the tool 61, to apply a tightening force to the band body 11.

In this second embodiment, before plastically deforming (or caulking) the caulking portions 30 and 40, the convex portion 71 is brought into contact with the temporal fixing stopper portion 75. In this manner, the distance between the leg portion 31 of the first caulking portion 30 and the projection wall 41 of the second caulking portion 40 is maintained to be constant. It is therefore possible to maintain a constant distance between the arms 60a and 60b of the tool 61 (shown in FIG. 1) used to make a caulking service, so the caulking process equipment can be automated. In addition, when decreasing the winding diameter of the band body 11, the convex portion 71 can be moved in the lengthwise direction of the band body 11 along the guide groove 72. The engage nail 34 can therefore be guided substantially straight to the receive hole 44, so insertion of the engage nail 34 into the receive hole 44 can be facilitated.

Figure 11:
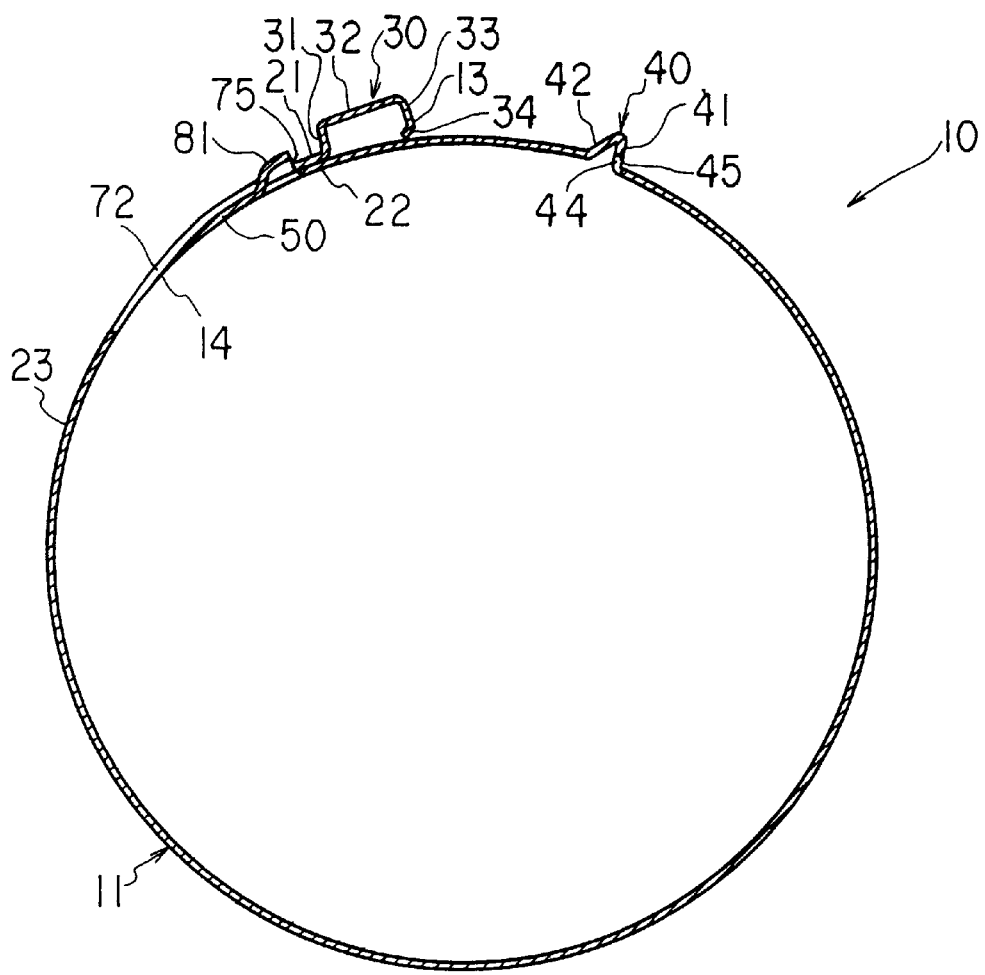
FIG. 11 is a cross-sectional view showing a boot band according to a third embodiment of the present invention.
Figure 12:
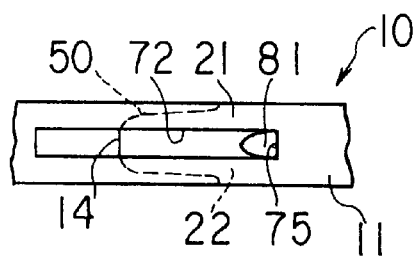
FIG. 12 is a plan view showing a part of the boot band in FIG. 11.
Figure 13:
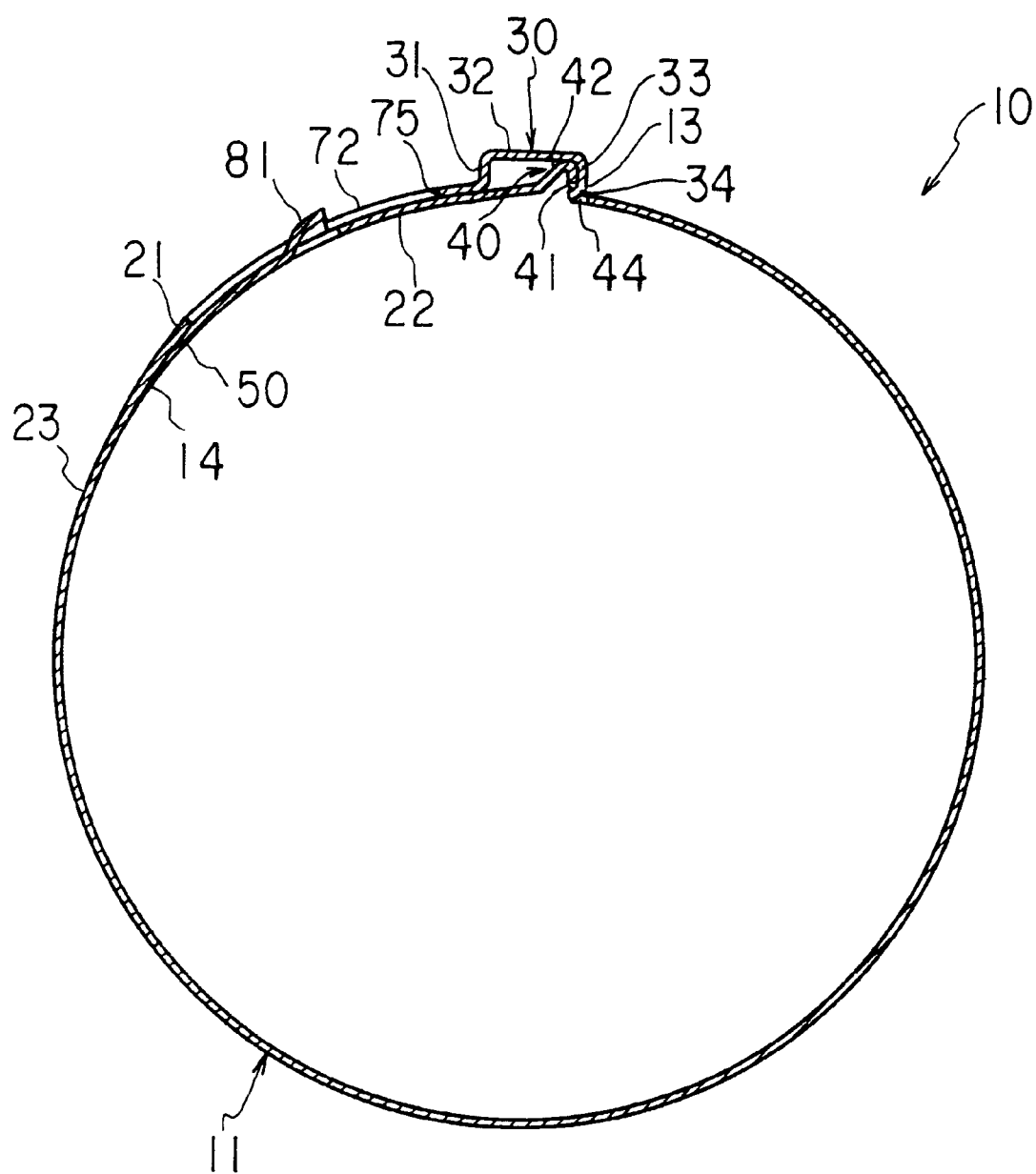
FIG. 13 is a cross-sectional view where the engage nail of the boot band in FIG. 11 is engaged in a receive hole.

The third embodiment shown in FIGS. 11 to 13 is an example in which a convex potion 81 is formed by press-embossing a part of the band body 11. Except for this point, the structure of this third embodiment is the same as that of the second embodiment (in FIGS. 9 and 10). The band body 11 of this third embodiment can be maintained in a temporal fixing state, since the convex portion 81 abuts into the stopper portion 75 in a state that the winding diameter is decreased to some extent as shown in FIGS. 11 and 12. By further decreasing the winding diameter of the band body 11, the second caulking portion 40 is inserted inside the first caulking portion 30, as shown in FIG. 13, and the engage nail 34 is engaged in the receive hole 44. Thereafter, like in the first embodiment (in FIG. 7), the first caulking portion 30 and the second caulking portion 40 are plastically deformed by the tool 61, thereby to apply a tightening force to the band body 11.

Figure 14:
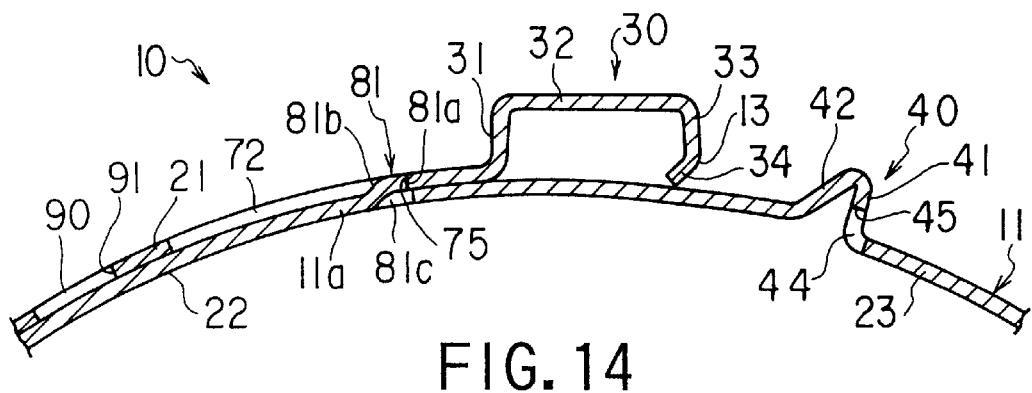
FIG. 14 is a cross-sectional view showing a part of a boot band according to a fourth embodiment of the present invention.
Figure 15:
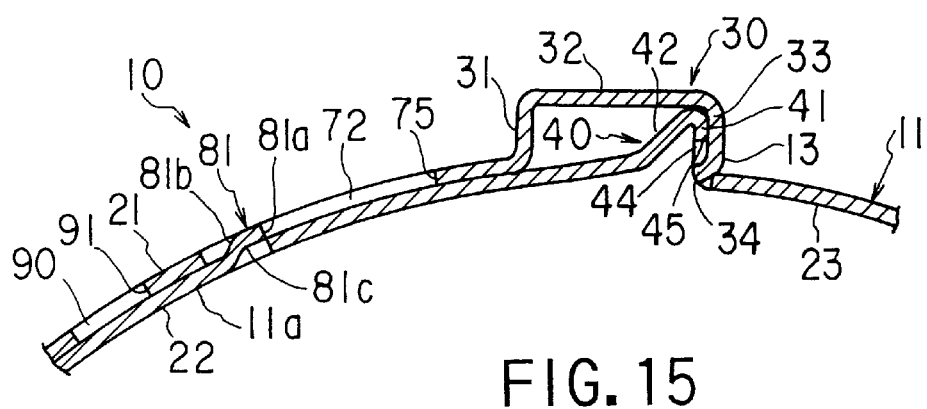
FIG. 15 is a cross-sectional view where the engage nail of the boot band in FIG. 14 is engaged in a receive hole.
Figure 16:
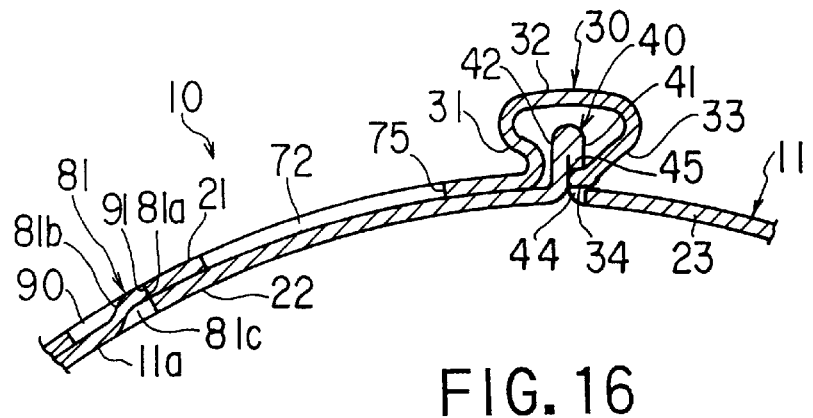
FIG. 16 is a cross-sectional view where first and second caulking portions of the boot band in FIG. 14 are caulked.

In the fourth embodiment shown in FIGS. 14 to 16, an opening portion 90 is formed behind the guide groove 72 of the above-described embodiment, and a tightness retain stopper portion 91 is provided at an end of the opening portion 90, i.e., the end close to the guide groove 72. Except for this point, the structure and operation of this embodiment are the same as those of the third embodiment. The convex portion 81 provided at the inner overlapping portion 22 of the band body 11 has a vertical wall 81a projecting from the surface of the band body 11 in the direction substantially vertical to the plate thickness direction, an upper wall 81b continuous to the vertical wall 81a, and a side wall 81c which integrally continues from both sides of the upper wall 81b to the main portion 11a of the band body 11. In this manner, high rigidity is attained against a load (tightening force) applied in the lengthwise direction of the band body 11.

As shown in FIG. 14, in the state that the band body 11 is decreased to a certain winding diameter, the vertical wall 81a of the convex portion 81 has a contact with the temporal fixing stopper potion 75, thereby maintaining the winding diameter. By further decreasing the winding diameter of the band body 11 from this temporal fixing state, the second caulking portion 40 is inserted inside the first caulking portion 30 as shown in FIG. 15, and the engage nail 34 is engaged in the receive hole 44.

Further, as shown in FIG. 16, the first caulking portion 30 and the second caulking portion 40 are integrally deformed plastically, thereby to tighten the band body 11 to a predetermined circumferential length. By this tightening, the vertical wall 81a of the convex portion 81 enters into the opening portion 90. At the same time, the vertical wall 81a has a contact on the tightness retain stopper portion 91 and receives thereby a load (i.e., the tightening force) with which the band body 11 behaves to widen. The "predetermined circumferential length" used in the present specification means a length to which the band body 11 is tightened until the whole circumference of the band body 11 creates a desired tightening force against the target member 17 to be tightened.

In addition to the advantages obtained by the above-described embodiments, the boot band 10 according to the fourth embodiment advantageously receives tightening forces by the convex portion 81 and the tightness retain stopper portion 91 and by the first caulking portion 30 and the second caulking portion 40. Further, since returning of the first caulking portion 30 is restricted by the second caulking portion 40 which returns by a less returning amount, the returning amount of the caulking portion 30 can be reduced.

Also, in this fourth embodiment, the vertical wall 81a of the convex portion 81 has a contact on the tightness retain stopper portion 91. Therefore, at the time point when the length of the band body 11 reaches a predetermined circumferential length, the vertical wall 81a can be engaged with the tightness retain stopper portion 91, with maintaining the circumferential length. It is therefore possible to avoid a movement in such a direction in which the band body 11 is loosened, when the vertical wall 81a and the tightness retain stopper portion 91 are engaged with each other. Near the vertical wall 81a, the first caulking portion 30 and the second caulking portion 40 are connected with each other by caulking. By this connection, the outer overlapping portion 21 is restricted from moving apart from the inner overlapping portion 22, so the engagement between the vertical wall 81a and the stopper portion 91 can be maintained sufficiently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A boot band made of a belt-like metal band body having first and second ends, said boot band being adapted to be set on a target member to be tightened in a state where the band body is rounded like a ring such that the first end of the band body is positioned outside the second end of the band body, said boot band comprising:

a first caulking portion having a first leg portion which is provided at a position close to the first end of the band body and which stands outward from the band body, a bridge portion which extends from the first leg portion toward the first end of the band body in a lengthwise direction of the band body, and a second leg portion which is bent from the bridge portion so as to face the first leg portion, said first caulking portion being adapted to be deformed so as to decrease a circumferential length of the band body in the state where the band body is rounded like a ring;

an engage nail provided at a top end of the second leg portion of the first caulking portion;

a second caulking portion to be inserted inside the first caulking portion when a winding diameter of the band body is decreased before deformation of said first caulking portion, the second caulking portion having a first projection wall which is provided at a position close to the second end of the band body and which projects outward from the band body, and a second projection wall which is bent to be adjacent to the first projection wall; and a receive hole which is formed in the first projection wall of the second caulking portion and which is engaged with the engage nail in a state where the second caulking portion is inserted inside the first caulking portion.

2. A boot band according to claim 1, further comprising a convex portion which is provided at an inner overlapping portion of the band body and which projects outward from the band body, and a temporal fixing stopper portion which contacts with the convex portion to prevent the band body from being widened in a state where the winding diameter of the band body is decreased.

3. A boot band according to claim 2, further comprising a guide groove, which is formed along a lengthwise direction of the band body and in which the convex portion is inserted movably in the lengthwise direction of the band body, and wherein the temporal fixing stopper portion is provided at an end of the guide groove.

4. A boot band made of a belt-like metal band body having first and second ends, said boot band being adapted to be set on a target member to be tightened in a state where the band body is rounded like a ring such that the first end of the band body is positioned outside the second end of the band body, said boot band comprising:

a first caulking portion having a first leg portion which is provided at a position close to the first end of the band body and which stands outward from the band body, a bridge portion which extends from the first leg portion toward the first end of the band body in a lengthwise direction of the band body, and a second leg portion which is bent from the bridge portion so as to face the first leg portion, said first caulking portion being adapted to be deformed so as to decrease a circumferential length of the band body in the state where the band body is rounded like a ring;

an engage nail provided at a top end of the second leg portion of the first caulking portion;

a second caulking portion to be inserted inside the first caulking portion when a winding diameter of the band body is decreased before deformation of said first caulking portion, the second caulking portion having a first projection wall which is provided at a position close to the second end of the band body and which projects outward from the band body, and a second projection wall which is bent to be adjacent to the first projection wall;

a receive hole which is formed in the first projection wall of the second caulking portion and which is engaged with the engage nail in a state where the second caulking portion is inserted inside the first caulking portion;

a convex portion which is provided at an inner overlapping portion of the band body and which projects outward from the band body; and a tightness retain stopper portion provided at an outer overlapping portion of the band body with which the convex portion makes contact in a state where the first and second caulking portions are caulked, thereby preventing the band body from being widened.

5. A boot band according to claim 4, wherein the convex portion has a vertical wall which projects from a surface of the band body in a vertical direction, in a position in which the convex portion contacts with the tightness retain stopper.

* * * * *